US012488084B2

(12) United States Patent
Zheng

(10) Patent No.: US 12,488,084 B2
(45) Date of Patent: Dec. 2, 2025

(54) DEVICE AUTHENTICATION METHOD AND SYSTEM, IOT DEVICE AND AUTHENTICATION SERVER

(71) Applicant: BOE Technology Group Co., Ltd., Beijing (CN)

(72) Inventor: Haitao Zheng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/280,213

(22) PCT Filed: Sep. 21, 2022

(86) PCT No.: PCT/CN2022/120073

§ 371 (c)(1),
(2) Date: Sep. 2, 2023

(87) PCT Pub. No.: WO2023/087895

PCT Pub. Date: May 25, 2023

(65) Prior Publication Data

US 2024/0143727 A1 May 2, 2024

(30) Foreign Application Priority Data

Nov. 22, 2021 (CN) ........................ 202111387516.2

(51) Int. Cl.
*H04L 29/06* (2006.01)
*G06F 21/44* (2013.01)

(52) U.S. Cl.
CPC .................................... *G06F 21/44* (2013.01)

(58) Field of Classification Search
CPC ...................................................... G06F 21/44
See application file for complete search history.

(56) References Cited

U.S. PATENT DOCUMENTS

| | | | |
|---|---|---|---|
| 2008/0178008 | A1 | 7/2008 | Takahashi et al. |
| 2016/0269374 | A1 | 9/2016 | Smith |

(Continued)

FOREIGN PATENT DOCUMENTS

| | | | |
|---|---|---|---|
| CN | 109614820 | A | 4/2019 |
| CN | 110071906 | A | 7/2019 |

(Continued)

OTHER PUBLICATIONS

CN2021113875162 first office action.
PCT/CN2022/120073 international search report.
PCT/CN2022/120073 Written Opinion.

*Primary Examiner* — Jason K Gee
(74) *Attorney, Agent, or Firm* — IPro, PLLC

(57) ABSTRACT

The present disclosure relates to a device authentication method and system, an IoT device, and an authentication server. The method includes: obtaining random data; obtaining public input parameters including the random data, and generating an authentication proof based on a preset proof parameter and the public input parameters; sending the authentication proof to an authentication server, such that the authentication server verifies the authentication proof based on a preset verification parameter to obtain an authentication result; obtaining the authentication result returned by the authentication server. This embodiment can use authentication proof without the need to use device key information for authentication, improving authentication security. Moreover, the authentication server is unable to restore device key information based on the authentication proof, further avoiding leakage of the device key information and improving information security.

6 Claims, 5 Drawing Sheets

IoT device 1
IoT device 2
IoT device 3
......
Device authentication
Authentication server
Authentication service 1
Authentication service 2
Authentication service 3
......
Issue device certificate
Administer server
Zero-knowledge proof support
Build server

(56) References Cited

U.S. PATENT DOCUMENTS

| | | | | |
|---|---|---|---|---|
| 2019/0156019 | A1 | 5/2019 | Chen | |
| 2021/0152545 | A1* | 5/2021 | Park | H04L 9/3268 |
| 2021/0297255 | A1 | 9/2021 | Wan et al. | |
| 2022/0393884 | A1* | 12/2022 | Panchamia | H04L 9/083 |

FOREIGN PATENT DOCUMENTS

| | | | | |
|---|---|---|---|---|
| CN | 110324151 | A | 10/2019 | |
| CN | 111211908 | A | 5/2020 | |
| CN | 112260995 | A | 1/2021 | |
| CN | 112436940 | A | 3/2021 | |
| CN | 112565265 | A | 3/2021 | |
| CN | 113890768 | A | 1/2022 | |
| EP | 4027675 | B1 * | 6/2025 | H04L 63/0853 |
| KR | 20080031622 | A | 4/2008 | |
| KR | 20140052605 | A | 5/2014 | |

* cited by examiner

DEVICE AUTHENTICATION METHOD AND SYSTEM, IOT DEVICE AND AUTHENTICATION SERVER

CROSS-REFERENCE TO RELATED APPLICATIONS

This application is a national stage of international PCT Application No. PCT/CN2022/120073, filed on Sep. 21, 2022, the entire contents of which are incorporated herein by reference.

TECHNICAL FIELD

The present disclosure relates to the field of authentication technology, and more particularly, to a device authentication method and a device authentication system, an Internet of Things (IoT) device and an authentication server.

BACKGROUND

With the development of IoT related technologies, the number of IoT devices connected to IoT platforms has also sharply increased, and their identities have become more complex. Therefore, in related art, trust management can be performed for IoT devices. For example, IoT platforms can obtain key information (such as keys) of devices and/or users sent by IoT devices, and then perform trust authentication on IoT devices based on the key information.

However, the authentication method in related art requires IoT devices to send their key information to the authentication server of the IoT platform. As IoT devices and authentication servers are connected over the internet (i.e. the public network), the key information tends to be leaked during transmission or interaction.

SUMMARY

The present disclosure provides a device authentication method and a device authentication system, an IoT device and an authentication server, in order to address the deficiency in the related art.

According to a first aspect of embodiments of the present disclosure, there is provided a device authentication method, applied to an Internet of Things IoT device, and the method including:

- obtaining random data;
- obtaining public input parameters including the random data, and generating an authentication proof based on a preset proof parameter and the public input parameters;
- sending the authentication proof to an authentication server, such that the authentication server verifies the authentication proof based on a preset verification parameter to obtain an authentication result;
- obtaining the authentication result returned by the authentication server.

Optionally, obtaining random data includes:

- generating first random data and sending the first random data to the authentication server such that the authentication server encrypts the first random data through a preset encryption algorithm to generate encrypted data, and sending the encrypted data to the IoT device;
- obtaining the encrypted data and decrypting the encrypted data through a preset decryption algorithm to obtain second random data;
- when the second random data is consistent with the first random data, taking the second random data as the obtained random data; otherwise, determining that no random data has been received.

Optionally, obtaining public input parameters including the random data, and generating an authentication proof based on a preset proof parameter and the public input parameters includes:

- obtaining a device number and a device certificate of the IoT device;
- taking the device number, the device certificate and the random data as the public input parameters, and inputting the public input parameters into a preset zero-knowledge proof circuit to obtain a solution vector of the zero-knowledge proof circuit;
- inputting the solution vector and the proof parameter into a preset zero-knowledge proof algorithm to obtain an authentication proof output by the zero-knowledge proof algorithm.

Optionally, the method further includes a step of obtaining the preset proof parameter, including:

- sending to a build server a build request including device key information, such that the build server generates a device certificate and a proof parameter corresponding to the device certificate based on the device key information; the device key information including a device number, a key, and a device type;
- obtaining the proof parameter sent by the build server to obtain the preset proof parameter.

According to a second aspect of embodiments of the present disclosure, there is provided a device authentication method, applied to a build server, and the method including:

- obtaining a build request including device key information sent by an Internet of Things IoT device; the device key information including a device number sn, a key sk, and a device type ct;
- obtaining a proof parameter of a zero-knowledge proof circuit according to the device key information;
- sending the proof parameter to the IoT device, such that the IoT device generates an authentication proof according to the proof parameter, the device key information, and the zero-knowledge proof circuit for authentication.

Optionally, obtaining a proof parameter of a zero-knowledge proof circuit according to the device key information includes:

- generating a device certificate for the IoT device based on the device key information;
- the device certificate being represented by a first polynomial C (sn, sk, ct);
- obtaining, based on a preset random data generation algorithm, a second polynomial F (sn, sk, ct, r) that matches the first polynomial;
- compiling the second polynomial into a zero-knowledge proof circuit, and obtaining the proof parameter of the zero-knowledge proof circuit.

Optionally, after compiling the second polynomial into a zero-knowledge proof circuit, the method further includes:

- obtaining a verification parameter of the zero-knowledge proof circuit;
- sending the verification parameter and the device certificate to an authentication server, such that the authentication server authenticates the IoT device based on the verification parameter, the device certificate, and the authentication proof sent by the IoT device.

According to a third aspect of embodiments of the present disclosure, there is provided a device authentication method, applied to an authentication server, and the method including:

obtaining an authentication proof sent by an Internet of Things IoT device; the authentication proof being generated by the IoT device based on random data;

generating a verification proof based on a preset verification parameter, a device certificate of the IoT device, and the random data;

authenticating the IoT device based on the verification proof and the authentication proof, to obtain an authentication result.

Optionally, prior to obtaining the authentication proof sent by the IoT device, the method further includes:

obtaining first random data sent by the IoT device;

encrypting the first random data through a preset encryption algorithm to generate encrypted data;

sending the encrypted data to the IoT device, such that the IoT device decrypts the encrypted data and verifies whether the authentication server is legitimate.

According to a fourth aspect of embodiments of the present disclosure, there is provided a device authentication system including: at least one Internet of Things IoT device, a build server, an authentication server, and an administer server;

wherein the administer server is configured to generate a key based on a registration request of the IoT device to register the IoT device;

the build server is configured to generate a proof parameter and a verification parameter corresponding to the zero-knowledge proof circuit according to the build request of the IoT device, and send the proof parameter to the IoT device and the authentication server;

the IoT device is configured to generate an authentication proof based on random data and a preset proof parameter and send the authentication proof to the authentication server;

the authentication server is configured to authenticate the IoT device based on the verification proof and the authentication proof, to obtain an authentication result.

According to a fifth aspect of embodiments of the present disclosure, there is provided an Internet of Things IoT device including:

a processor;

a memory for storing computer programs executable by the processor;

wherein the processor is configured to execute computer programs in the memory to implement the method described above.

According to a sixth aspect of embodiments of the present disclosure, there is provided a server including:

a processor;

a memory for storing computer programs executable by the processor;

wherein the processor is configured to execute computer programs in the memory to implement the method described above.

According to a seventh aspect of embodiments of the present disclosure, there is provided a non-transitory computer-readable storage medium, wherein when an executable computer program in the storage medium is executed by a processor, the method described above can be implemented.

The technical solution provided by the embodiments of the present disclosure can bring the following beneficial effects:

It can be seen from the above embodiments, the solution provided in the embodiment of the present disclosure can obtain random data; obtain public input parameters including the random data, and generate an authentication proof based on a preset proof parameter and the public input parameters; send the authentication proof to the authentication server such that the authentication server verifies the authentication proof based on a preset verification parameter to obtain an authentication result; and obtain the authentication result returned by the authentication server. In this way, this embodiment can use authentication proof without the need to use device key information for authentication, thus can improve authentication security. Moreover, the authentication server is unable to restore device key information based on the authentication proof, further avoiding leakage of the device key information and improving information security.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION OF THE EMBODIMENTS

Here, a detailed explanation will be given of exemplary embodiments, examples of which are shown in the accompanying drawings. When the following description refers to the accompanying drawings, like numerals in different drawings refer to like or similar elements unless otherwise indicated. The exemplary embodiments described below do not represent all embodiments that are consistent with the present disclosure. Rather, they are merely examples of apparatuses and methods consistent with some aspects of the present disclosure as detailed in the appended claims. It should be noted that, without conflict, the features in the following embodiments and embodiments can be combined with each other.

With the development of IoT related technologies, the number of IoT devices connected to IoT platforms has also sharply increased, and their identities have become more complex. Therefore, in related art, trust management can be performed for IoT devices. For example, IoT platforms can obtain key information (such as keys) of devices and/or users sent by IoT devices, and then perform trust authentication on IoT devices based on the key information.

However, the authentication method in related art requires IoT devices to send their key information to the authentication server of the IoT platform. As IoT devices and authentication servers are connected over the internet (i.e. the public network), the key information tends to be leaked during transmission or interaction.

Figure 1:
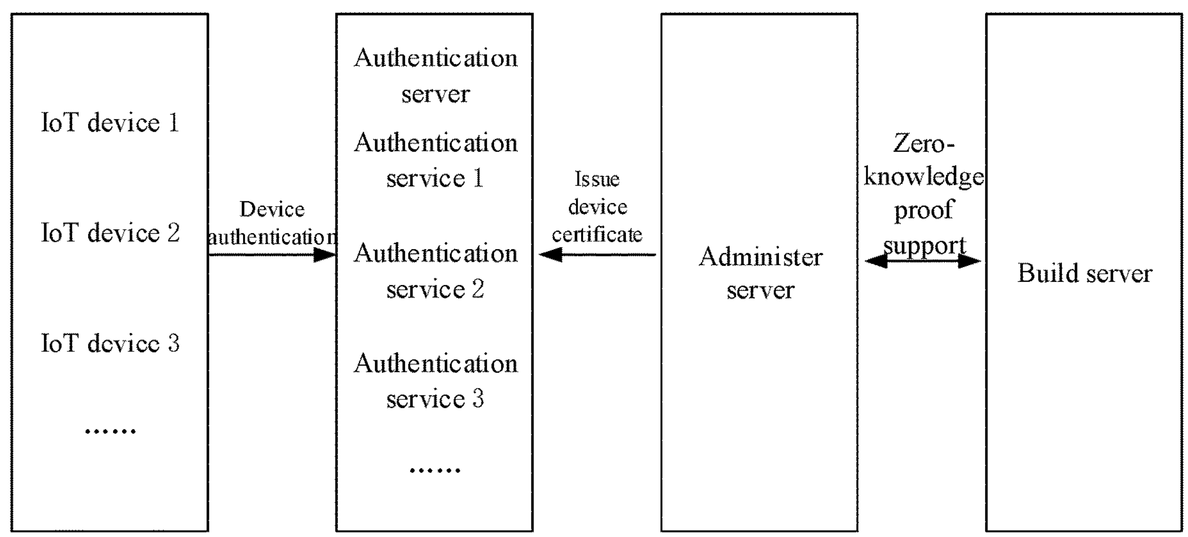
FIG. 1 is a block diagram of a device authentication system shown according to an exemplary embodiment.

To address the aforementioned technical issues, an embodiment of the present disclosure provides a device authentication method and a device authentication system. As shown in FIG. 1, the device authentication system can include at least one IoT device, a build server, an authentication server, and an administer server. Here, each IoT device communicates and connects with the build server, the authentication server, and the administer server respectively, and the build server, the authentication server, and the administer server communicate with each other.

The administer server is configured to generate a key based on a registration request from an IoT device, in order to register the IoT device. The build server is configured to generate, based on a build request from the IoT device, a proof parameter and a verification parameter corresponding to a zero-knowledge proof circuit, and send the proof parameter to the IoT device and the authentication server. The IoT device is configured to generate an authentication proof based on random data and a preset proof parameter and send them to the authentication server. The authentication server is configured to authenticate the IoT device based on a verification proof and the authentication proof, to obtain an authentication result.

Considering that the above device authentication method is based on implementation of an device authentication system, subsequent embodiments will describe the operation process of the device authentication system based on the operation of each device and the server in the device authentication process.

In practical applications, the build server and the administer server can be implemented by the same server. The authentication server can be a third-party server. The IoT device can include various intelligent devices, such as smart watches, smart bracelets, Smartglasses and other smart wear devices, air purifiers, sweeping robots, smart lamps and other smart homes, and so on.

Figure 2:
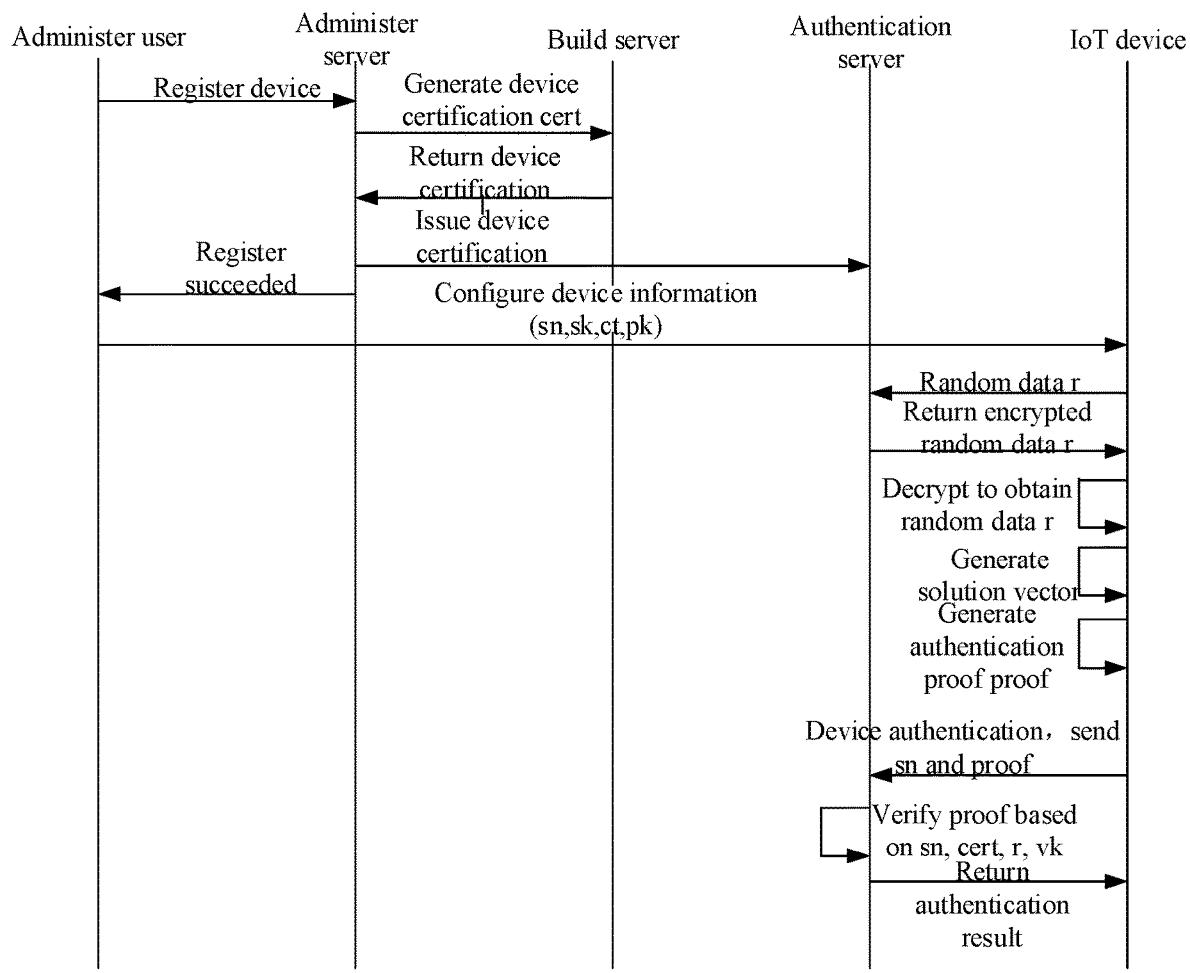
FIG. 2 is a flowchart illustrating interaction between devices in a device authentication system according to an exemplary embodiment.
Figure 3:
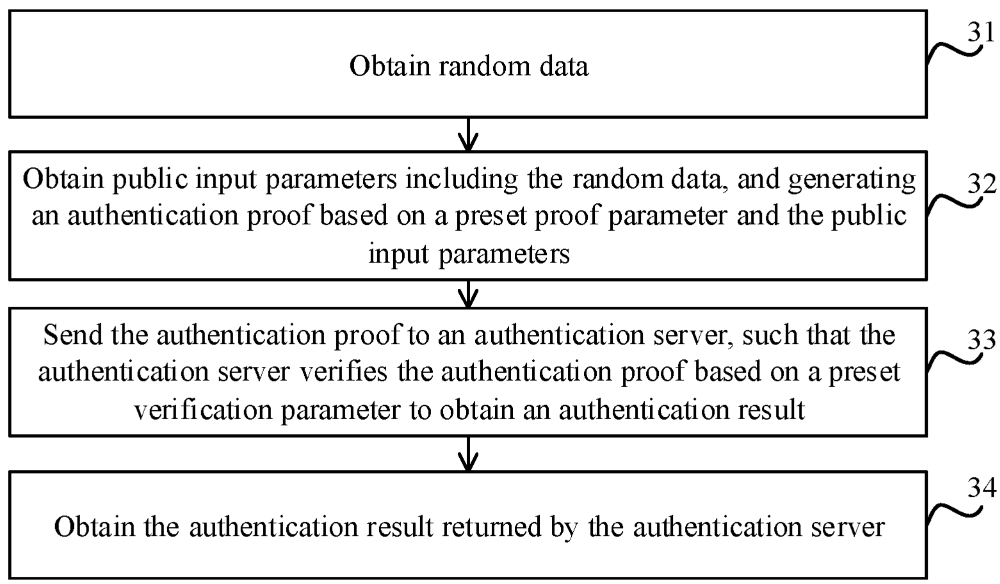
FIG. 3 is a flowchart of a device authentication method illustrated according to an exemplary embodiment.

FIG. 2 is a flowchart of the interaction between various devices in a device authentication system according to an exemplary embodiment, while FIG. 3 is a flowchart of a device authentication method according to an exemplary embodiment. As shown in FIGS. 2 and 3, a device authentication method can be applied to an IoT device, including steps 31 to 34.

In step 31, random data is obtained.

In this embodiment, an IoT device can obtain random data from the authentication server.

When there is a need for authentication, an IoT device can send an authentication request to the authentication server, and the authentication request is used to request the authentication server to authenticate the IoT device. It is understandable that, in addition to the device information required for the authentication process, the authentication request of this example also includes random data (hereinafter referred to as first random data), which is generated by the IoT device through a preset random number generation algorithm.

In this ex ample, the authentication server can obtain the first random data upon receiving the authentication request. Then, the authentication server can use preset encryption algorithms (such as MD5, SHA1, HMAC algorithm, etc.) to encrypt the first random data to obtain encrypted data, and send the encrypted data to the IoT device. The IoT device can use a preset decryption algorithm (such as MD5, SHA1, HMAC algorithms, etc.) to decrypt the encrypted data to obtain second random data.

It should be noted that the encryption algorithm and decryption algorithm can appear in pairs, that is, the data encrypted by the preset encryption algorithm can be decoded to the original data by the decryption algorithm of the same pair, so as to ensure the security of data transmission. Those skilled in the art can choose appropriate encryption and decryption algorithms based on specific scenarios, and there are no restrictions here.

It should be noted that since the authentication server is not all legitimate, not all of the decrypted random data is the first random data. Therefore, it is called the second random data to distinguish it from the first random data.

After that, the IoT device can compare the first random data with the second random data. When the second random data is consistent with the first random data, the IoT device can determine that the authentication server is legitimate, and at this time, the second random data can be used as the obtained random data; otherwise, it can be determined that the authentication server is illegitimate, and the IoT device can determine that random data has not been received.

It should be noted that the consistency of the first random data and the second random data means that they are the same or matched, where matching means that the second random data is generated by a certain rule on the first random data (such as the subsequent random number generation algorithm R (r), and the second random data and the first random data are mapped one by one.) For example, the subsequent random number r is regarded as the first random data, and the value R (r) of the random number generation algorithm R is regarded as the second random data, and r is consistent with R (r).

In step 32, public input parameters including the random data are obtained, and an authentication proof is generated based on a preset proof parameter and the public input parameters.

Figure 4:
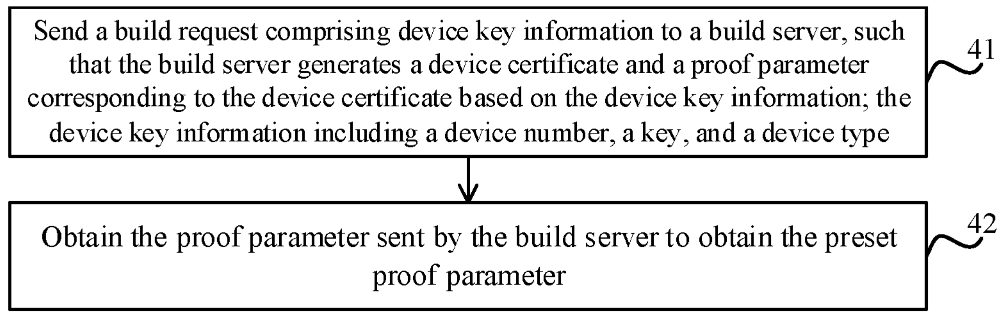
FIG. 4 is a flowchart for obtaining a proof parameter and a device certificate according to an exemplary embodiment.

In this embodiment, the IoT device can store the preset proof parameter, as shown in FIG. 4, including steps 41 and 42. In step 41, the IoT device can send to the build server a build request including device key information, such that the build server generates a device certificate and a proof parameter corresponding to the device certificate based on the device key information.

Taking the device key information including a device number (sn), a device key (sk), and a device type (ct) as an example, the build server can define a polynomial C(sn, sk, ct) that generates a device certificate (cert) for an IoT device. Moreover, the build server can define a random number generation algorithm R(r), whose input parameter is random data (r). Here, the above random data r comes from the IoT device, which is the first random data exemplified in step 31. The build server can transform the device authentication problem into the following polynomial:

$$F(sn,sk,ct,r)=C(sn,sk,ct)R(r).$$

Then, the build server can compile the polynomial F (sn, sk, ct, r) into a circuit, that is, a zero-knowledge proof circuit. Here, the zero-knowledge proof circuit can be composed of several gates, such as an addition gate and a multiplication gate. Each gate has several input pins and several output pins. Each gate can perform one addition or one multiplication operation. Thus, in each proof process, the values on the connecting lines of each gate can be obtained. By verifying whether the input and output values of each gate meet the addition or multiplication equations, it can be determined that a certain object (such as an IoT device) participates in the proof process. In practical applications, the zero-knowledge proof circuit can be a library or an executable program, such that it can be easily transplanted into the IoT device.

After that, the build server can use the device number sn, the device certificate cert and the random data r as the public input parameters to generate the proof parameter pk and the verification parameter vk of the zero-knowledge proof circuit. Here, the proof parameter pk can be sent to the IoT device. The verification parameter vk and device certificate are sent to the administer server and forwarded by the administer server to the authentication server.

It should be noted that the device certificate of IoT devices can be obtained from the build server or generated by the IoT device itself based on the key sk, the device number sn, and the device type ct, which is not limited in the present disclosure. In the present disclosure, the implementation of the embodiments will be described with reference to an example in which the device certificate is generated by the IoT device itself.

In step 42, the IoT device can obtain the proof parameter sent by the build server. That is, the IoT device obtain the preset proof parameter and store the same in a designated location (such as a local storage or a cache).

Figure 5:
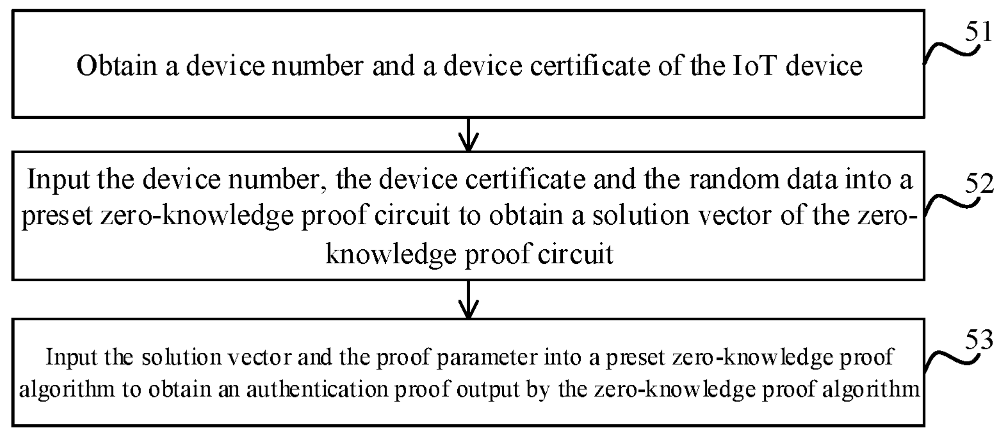
FIG. 5 is a flowchart for obtaining an authentication proof according to an exemplary embodiment.

In this embodiment, after obtaining the proof parameter and the random data, the IoT device can obtain an authentication proof, as shown in FIG. 5, including steps 51 to 53. In step 51, the IoT device can obtain a device number and a device certificate of the IoT device. In step 52, the IoT device can input the device number, the device certificate and the random data into the preset zero-knowledge proof circuit to obtain a solution vector of the zero-knowledge proof circuit. The solution vector is intermediate data of the proof process, which can include both a public parameter and a private input parameter. In step 53, the IoT device can input the solution vector (or the private input parameter in the solution vector) and the proof parameter to the preset zero-knowledge proof algorithm (such as ZKP algorithm or zk-SNARK algorithm), to obtain output data of the preset zero-knowledge proof algorithm, and use the output data as the authentication proof. In this way, in this example, the authentication proof can be used to replace the device key information of the IoT device, so as not to cause information leakage and ensure the safety of the device key information.

In step 33, the authentication proof is sent to the authentication server, such that the authentication server verifies the authentication proof based on a preset verification parameter to obtain an authentication result.

In this embodiment, the IoT device can send the authentication proof to the authentication server. The authentication server stores the zero-knowledge proof algorithm. At this time, the device number, the device certificate, the verification parameter and the random data (such as the first random data or the random data that matches the first random data) can be input into the zero-knowledge proof algorithm, to obtain the verification data output by the zero-knowledge proof algorithm. Then the authentication server can authenticate the IoT device based on the verification proof and the authentication proof. For example, when the verification proof is the same as the authentication proof, it determines that the authentication result is true, indicating successful authentication. When the authentication result is determined to be false when the verification proof is different from the authentication proof, it indicates that the authentication has failed. The authentication server can determine the successful or failed authentication results.

In step 34, the authentication result returned by the authentication server is obtained.

In this embodiment, the IoT device can obtain the authentication result returned by the authentication server and perform corresponding operation based on the authentication result, such as accessing the IoT platform, communicating with the IoT platform, etc. The corresponding operations can be set according to specific scenarios, and are not limited here.

At this point, the solution provided in the embodiment of the present disclosure can obtain random data; obtain public input parameters including the random data, and generate an authentication proof based on a preset proof parameter and the public input parameters; send the authentication proof to the authentication server such that the authentication server verifies the authentication proof based on a preset verification parameter to obtain an authentication result; and obtain the authentication result returned by the authentication server. In this way, this embodiment can use authentication proof without the need to use device key information for authentication, thus can improve authentication security. Moreover, the authentication server is unable to restore device key information based on the authentication proof, further avoiding leakage of the device key information and improving information security.

Figure 6:
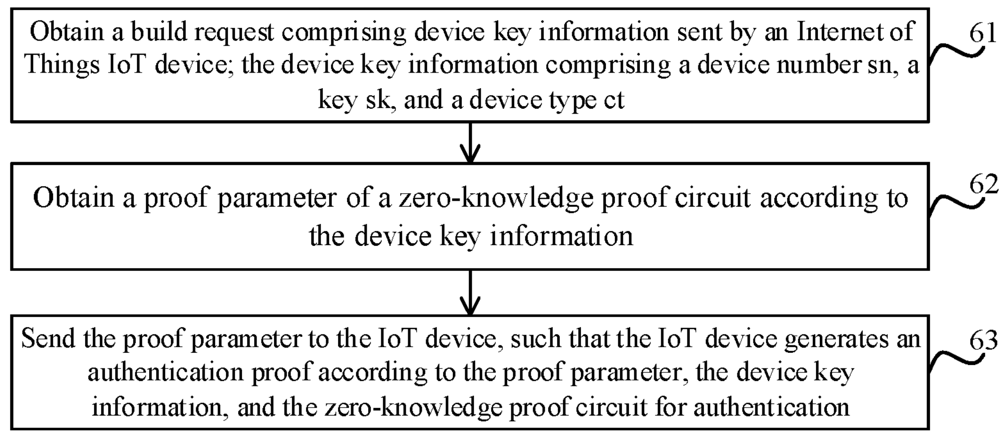
FIG. 6 is a flowchart of another device authentication method illustrated according to an exemplary embodiment.

FIG. 6 is a flowchart of a device authentication method according to an exemplary embodiment. As shown in FIG. 6, a device authentication method can be applied to a build server, including steps 61 to 63.

In step 61, a build request including device key information sent by an IoT device is obtained; the device key information including a device number sn, a key sk, and a device type ct.

In this embodiment, the build server can communicate with the IoT device and obtain a build request sent by the IoT device, the build request can include the device key information. Here, the device key information includes a device number sn, a key sk, and a device type ct.

In step 62, a proof parameter of a zero-knowledge proof circuit is obtained according to the device key information.

In this embodiment, the build server can obtain the proof parameter of the zero-knowledge proof circuit according to the device key information. Taking the device key information including a device number (sn), a device secret key (sk), and a device type (ct) as an example, the build server can define a first polynomial C (sn, sk, ct) that generates a device certificate (cert) for an IoT device. Moreover, the build server can define a random number generation algorithm R (r), whose input parameter is the random data (r). Here, the random data r comes from the IoT device, which is the first random data exemplified in step 31. The build server can transform the device authentication problem into the following second polynomial F (sn, sk, ct, r):

$$F(sn,sk,ct,r)=C(sn,sk,ct)R(r).$$

Then, the build server can compile the second polynomial F (sn, sk, ct, r) into a circuit, that is, a zero-knowledge proof circuit. Here, the zero-knowledge proof circuit can be composed of several gates, such as an addition gate and a multiplication gate. Each gate has several input pins and several output pins; Each gate can perform one addition operation or one multiplication operation. Thus in each proof process, values on the connecting lines of each gate can be obtained. By verifying whether the input and output values of each gate meet the addition or multiplication equations, it can be determined that a certain object (such as an IoT device) participates in the proof process. In practical applications, the zero-knowledge proof circuit can be a library or an executable program, such that it can be easily transplanted to an IoT device.

Then, the build server can use the device number sn, the device certificate cert and the random data r as public input parameters to generate the proof parameter pk and the verification parameter vk of the zero-knowledge proof circuit. Here, the proof parameter pk can be sent to the IoT device. The verification parameter vk and the device certificate are sent to the authentication server to authenticate the IoT device based on the verification parameter, the device certificate, and the authentication proof sent by the IoT device.

In step 63, the proof parameter is sent to the IoT device such that the IoT device generates an authenticate proof for authentication according to the proof parameter, the device key information and the zero-knowledge proof circuit.

At this point, in this embodiment, the build server can convert the device key information (the device number sn, the key sk, and the device type ct) into a device certificate and a verification parameter and send them to the authentication server, thereby avoiding the authentication server from obtaining the key sk and other information, avoiding leakage of the key information, and improving information security.

Figure 7:
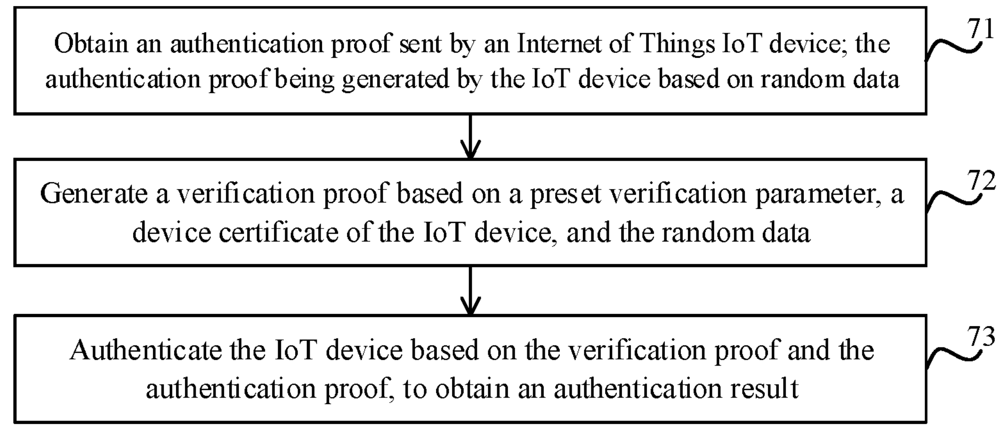
FIG. 7 is a flowchart of another device authentication method illustrated according to an exemplary embodiment.

FIG. 7 is a flowchart of a device authentication method according to an exemplary embodiment. As shown in FIG. 7, a device authentication method can be applied to an authentication server, including steps 71 to 73.

In step 71, an authentication proof sent by an IoT device is obtained; the authentication proof is generated by the IoT device based on random data.

In this embodiment, the authentication server can communicate with the IoT device and obtain the authentication proof sent by the IoT device. How the IoT device generates the authentication proof can be seen in the implementation shown in FIG. 3, and will not be elaborated here.

In step 72, a verification proof is generated based on a preset verification parameter, the device certificate of the IoT device, and the random data.

In this embodiment, the authentication server can generate a verification proof based on the preset verification parameter, the device certificate of the IoT device, the device number, and the random data, where the device number, the random data, and the device certificates are the public input parameters mentioned above. How the authentication server generates a verification proof can be seen in step 33 of the embodiment shown in FIG. 3, and will not be further elaborated here.

In step 73, the IoT device is authenticated based on the verification proof and the authentication proof to obtain an authentication result. Reference can be made to step 33 for details, and will not elaborate on it here.

At this point, in this embodiment, the authentication server can authenticate the IoT device by simply obtaining the device number and the authentication proof, without the need for key information such as keys, thus avoiding information leakage and improving information security.

In an exemplary embodiment, an IoT device is also provided, including:

- a processor;
- a memory for storing computer programs executable by the processor;
- wherein the processor is configured to execute computer programs in the memory to implement the method described in FIG. 3.

Figure 8:
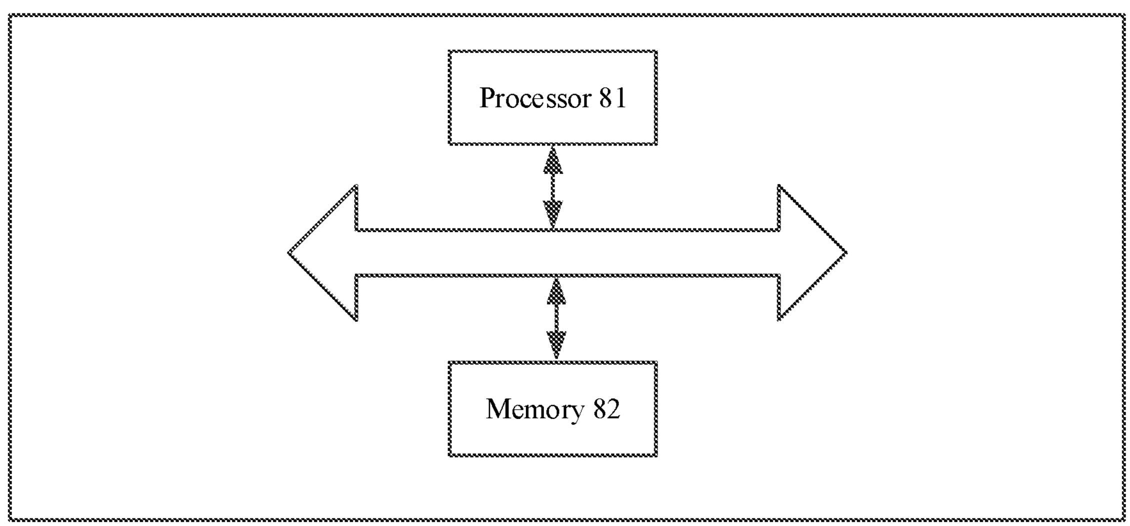
FIG. 8 is a block diagram of a server illustrated according to an exemplary embodiment.

In an exemplary embodiment, a server is also provided, which can be the administer server, the authentication server, or the build server shown in FIG. 1, as shown in FIG. 8, including:

- a processor 81;
- a memory 82 for storing computer programs executable by the processor;
- wherein the processor is configured to execute computer programs in the memory to implement the methods described in FIGS. 6 and 7.

In an exemplary embodiment, a non-transitory computer readable storage medium is also provided, such as a memory including executable computer programs that can be executed by a processor to implement the methods shown in the embodiments of FIGS. 3, 6, and 7. The readable storage medium can be a ROM, a Random-access memory (RAM), a CD-ROM, a tape, a floppy disk, an optical data storage device, etc.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A device authentication method, applied to an Internet of Things IoT device, and the method comprising:

- obtaining random data;
- obtaining public input parameters comprising the random data, and generating an authentication proof based on a preset proof parameter and the public input parameters;
- sending the authentication proof to an authentication server, such that the authentication server verifies the authentication proof based on a preset verification parameter to obtain an authentication result;
- obtaining the authentication result returned by the authentication server.

2. The method according to claim 1, wherein obtaining random data comprises:

- generating first random data and sending the first random data to the authentication server such that the authentication server encrypts the first random data through a preset encryption algorithm to generate encrypted data, and sending the encrypted data to the IoT device;
- obtaining the encrypted data and decrypting the encrypted data through a preset decryption algorithm to obtain second random data;
- when the second random data is consistent with the first random data, taking the second random data as the obtained random data; otherwise, determining that no random data has been received.

3. The method according to claim 1, wherein obtaining public input parameters including the random data, and generating an authentication proof based on a preset proof parameter and the public input parameters comprises:

obtaining a device number and a device certificate of the IoT device;

taking the device number, the device certificate and the random data as the public input parameters, and inputting the public input parameters into a preset zero-knowledge proof circuit to obtain a solution vector of the zero-knowledge proof circuit;

inputting the solution vector and the proof parameter into a preset zero-knowledge proof algorithm to obtain an authentication proof output by the zero-knowledge proof algorithm.

4. The method according to claim 1, wherein the method further comprises a step of obtaining the preset proof parameter, comprising:

sending to a build server a build request comprising device key information, such that the build server generates a device certificate and a proof parameter corresponding to the device certificate based on the device key information; the device key information comprising a device number, a key, and a device type;

obtaining the proof parameter sent by the build server to obtain the preset proof parameter.

5. An Internet of Things IoT device comprising:

a processor;

a memory for storing computer programs executable by the processor;

wherein the processor is configured to execute computer programs in the memory to implement the method according to claim 1.

6. A non-transitory computer-readable storage medium, wherein when an executable computer program in the storage medium is executed by a processor, the method according to claim 1 can be implemented.

* * * * *